United States Patent
Son

(10) Patent No.: US 6,402,815 B1
(45) Date of Patent: Jun. 11, 2002

(54) METHODS AND APPARATUS FOR PURIFYING AIR USING MIXING LIQUID

(76) Inventor: Cheolsoo Son, 2nd Kwangjang Apartment 201dong 807ho Segu, Naidang 4 dog 463-8, Taigu (KR), 703-064

( * ) Notice: Subject to any disclaimer, the term of this patent is extended or adjusted under 35 U.S.C. 154(b) by 0 days.

(21) Appl. No.: 09/586,712

(22) Filed: Jun. 5, 2000

(30) Foreign Application Priority Data

Jul. 12, 1999 (KR) ............................................. 99-28065

(51) Int. Cl.7 ........................... B01D 47/00; B01D 45/12
(52) U.S. Cl. .............................. 95/218; 95/216; 95/221; 96/281; 96/282; 55/472
(58) Field of Search ....................... 95/151, 210, 216, 95/217, 218, 221; 96/268, 272, 281, 282, 322, 327; 55/400, 401, 472

(56) References Cited

U.S. PATENT DOCUMENTS

| | | | |
|---|---|---|---|
| 1,817,265 A | 8/1931 | Hopkins | |
| 2,208,673 A | 7/1940 | Pando | |
| 2,468,354 A * | 4/1949 | Abbrecht | 55/400 |
| 2,551,815 A * | 5/1951 | Schultz | 261/112.1 |
| 3,395,513 A * | 8/1968 | Von Unwerth | 95/151 |
| 3,507,479 A * | 4/1970 | Pearl | 261/30 |
| 3,544,084 A * | 12/1970 | Macrow | 261/29 |
| 3,548,568 A * | 12/1970 | Carlson, Jr. et al. | 95/218 |
| 3,745,745 A | 7/1973 | Mare | 55/95 |
| 3,930,281 A | 1/1976 | Principe | 15/320 |
| 3,936,283 A | 2/1976 | Solis | |
| 3,980,080 A | 9/1976 | Muto | 128/146.6 |
| 4,005,999 A | 2/1977 | Carlson | 55/93 |
| 4,179,768 A | 12/1979 | Sawyer | 15/352 |
| 4,214,881 A * | 7/1980 | Filss | 95/282 |
| 4,289,506 A * | 9/1981 | Stone | 95/218 |
| 4,487,746 A | 12/1984 | Tahiliani | 422/170 |
| 4,585,599 A | 4/1986 | Czarno | 261/2 |
| 4,624,688 A | 11/1986 | Vatunen | |
| 4,867,878 A * | 9/1989 | Rashev | 55/400 |
| 5,017,201 A | 5/1991 | Park | 55/227 |

FOREIGN PATENT DOCUMENTS

| | | |
|---|---|---|
| DE | 4415542 A | 9/1994 |
| DE | 44 15 542 A1 * | 9/1994 |
| JP | 61-68113 A | 4/1986 |
| KR | 1990-125 | 1/1990 |
| KR | 92-002983 A | 2/1992 |

* cited by examiner

*Primary Examiner*—Duane Smith
*Assistant Examiner*—Jason M. Greene
(74) *Attorney, Agent, or Firm*—Philip K. Yu

(57) ABSTRACT

Methods and apparatus for purifying contaminated air using mixed liquid are disclosed. The invention includes an air inlet structure for taking in contaminated air, an air purifying compartment connected to the air inlet structure at one end for purifying contaminated air, and an air outlet structure connected to the air purifying compartment at another end for discharging purified air to the outside. The invention uses mixed liquid in its air purifying method. The invention includes a method that uses centrifugal force to form a mixed liquid filter, a method that takes in contaminated air, a method that purifies the contaminated air, and a method that discharges purified air to the outside. The invention can achieve a high degree of economic efficiency and a high degree of purification efficiency.

17 Claims, 4 Drawing Sheets

FIG. 3 b
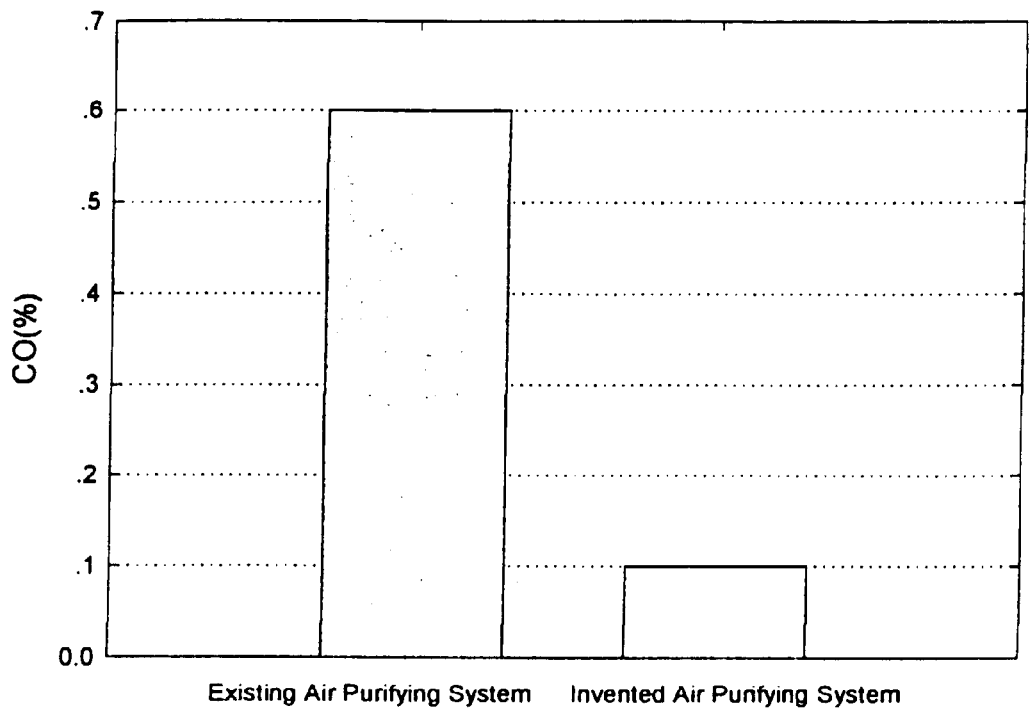
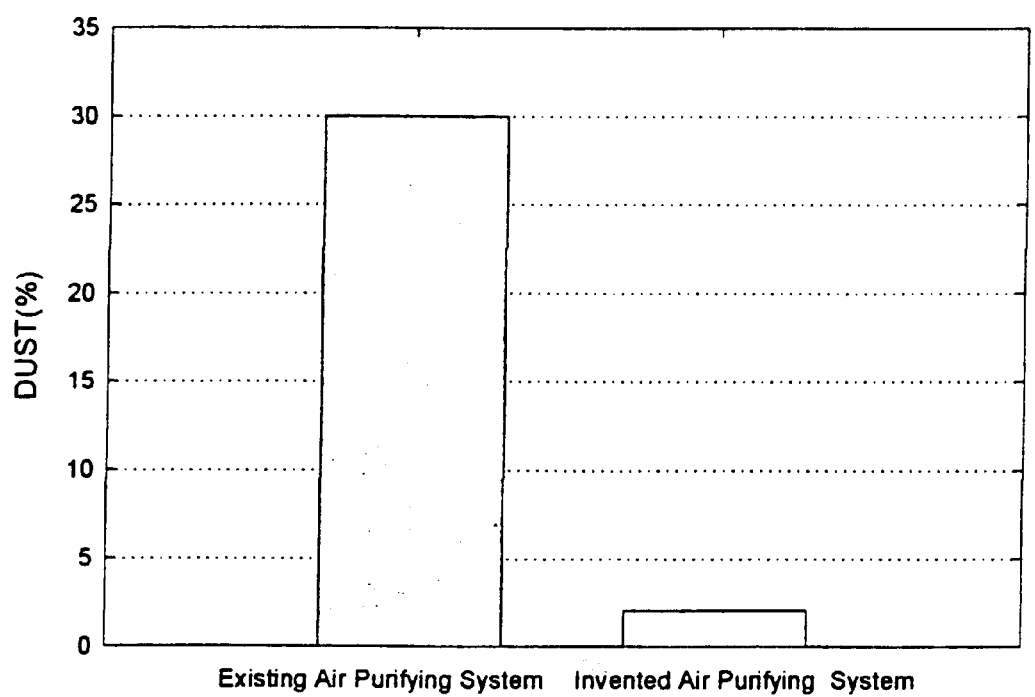
FIG. 3 c

METHODS AND APPARATUS FOR PURIFYING AIR USING MIXING LIQUID

CROSS-REFERENCE TO RELATED APPLICATIONS

This application claims the benefit of Korean Patent Application No. 1999-28065, filed July 12, 1999.

BACKGROUND OF THE INVENTION

1. Field of the Invention

The invention relates to methods and apparatus for purifying contaminated air, and more specifically to methods and apparatus for forming a liquid filter using centrifugal force that is applied to the liquid to eliminate contaminants and for absorbing, diluting, dissolving, and disassimilating harmful objects in the air using a multi-stage air purification process.

2. Related Art

An air purifying device can be used, for example, in a ventilation system or in an air treatment facility. A primary function of an air purifying device is to reduce the amount of contaminated materials and objects harmful to human health to a level that is healthy.

There are generally three techniques of purifying air. One is the usage of a particulate or adsorption filter. Such a filter having a fixed shape can be placed within a duct or channel which transfers air. Particulate or adsorption filters can be of many different shapes, sizes, and forms. Materials commonly used in these filters include, among others, glass fiber, cellulose paper, cotton, polyurethane, and other synthetic materials. The basic operating principles of particulate or adsorption filters are to capture particles that are larger than the gaps in the filters and block them from passing through the filters, to capture the particles using an adhesive force that is created when the particles collide with the surface of the fibers, and to capture small particles by moving the particles in a direction which causes more collisions between the fibers and particles.

A second technique uses a sprayer. A sprayer can be installed to eject water within a duct or channel which transfers air. The basic operating principles of a sprayer is to capture the contaminants in the air using fine liquid particles and to control humidity simultaneously. Recently, high pressure pumps have been employed to eject ultra-fine liquid particles that are quickly evaporated providing cooling.

A third technique uses an electrostatic air filter. Such a filter can be installed within a duct or channel which transfers air. An electrostatic air filter first passes dirty air between ionizing wires which are at a high voltage. Electrons are stripped from the particulate contaminants, leaving them positively charged. Then, these ionized particles pass between collector plates that are closely spaced and oppositely charged. The particles are simultaneously repelled by the positive plates and attracted to the negative plates, where they are collected.

A filter selection can depend on, among others, the required level of cleanliness, the installation location, and cost. While a particular type of filter can be used by itself, various types of filters are often combined to increase the efficiency.

Existing air purification filter systems have significant disadvantages. First, particulate filters need regular cleaning, maintenance, and replacement. In addition, the contaminants removed by the filters and used filters become another origin of contamination. Secondly, a sprayer requires constant ejection of water to eliminate contaminants in the air, resulting in excessive usage of water. A sprayer further requires a device to collect the water used and a system to treat the contaminated water. Thirdly, an electrostatic air filter requires a complex electronic device, and its initial installation cost is high. In addition, it is debated as to whether the ions produced by electrostatic air filters are harmful to people.

The invention provides a simple mechanical structure and a simple air purifying process to overcome the disadvantages of prior art air purifying systems. The maintenance and operational costs of an air purifying system of the invention are significantly lower than those of existing air purifying systems. In addition, the invented system can achieve a higher degree of purification efficiency in comparison with that of existing air purifying systems.

SUMMARY OF THE INVENTION

The invention has the following advantages: First, because the air purifying system of the invention utilizes a simple mechanical structure and a simple purifying method, various costs associated with the invented system such as the manufacturing cost, maintenance cost, and operational cost are significantly lower than those of existing air purifying systems. The invented system is highly economical in terms of, among others, maintenance and operation. Second, the invented system can provide various air purifying capabilities using centrifugal force and can purify air in multi-stages. As a result, the invented system can achieve a higher degree of purification efficiency in comparison with that of existing air purifying systems.

Figure 1:
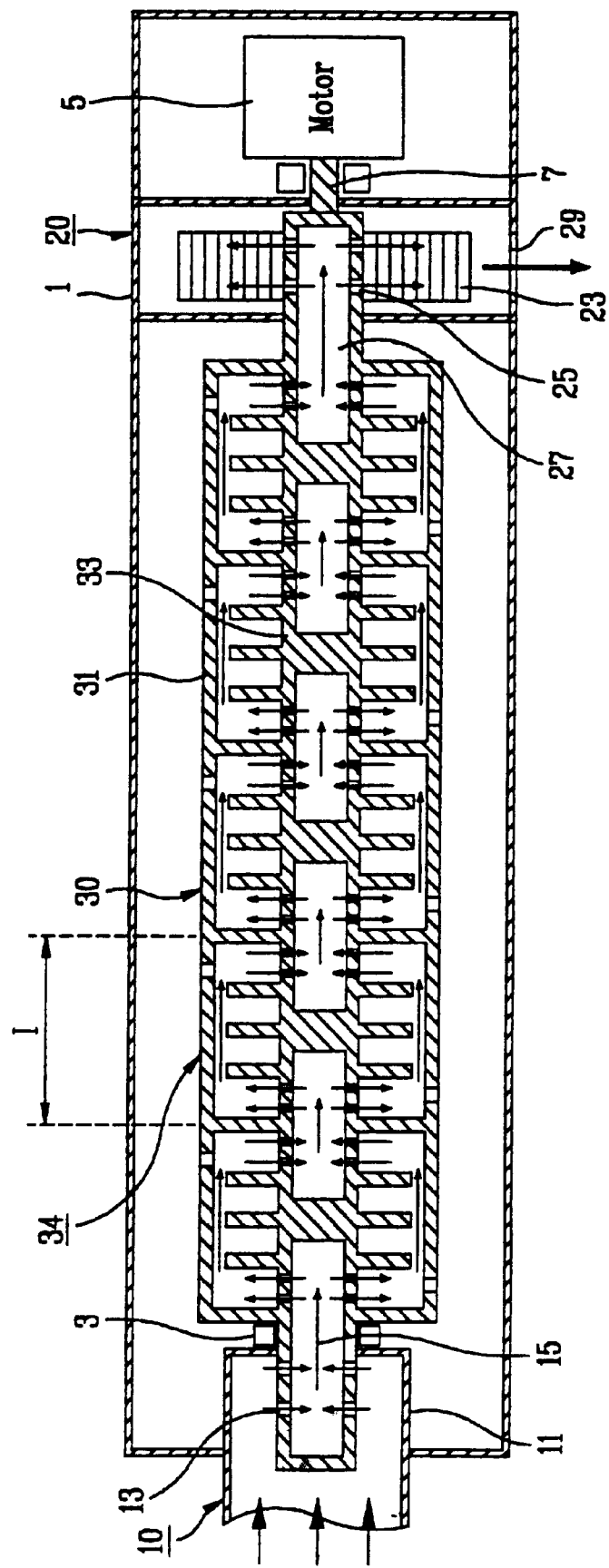
FIG. 1 illustrates a cross-sectional view along the axial direction of an exemplary air purifying device of the invention using mixed liquid.

Description of the main parts in the drawings:

| | |
|---|---|
| 1: outer case | 5: motor |
| 10: air inlet structure | 11: contaminated air transfer chamber |
| 13: contaminated air inlet | 15: contaminated air inlet passageway |
| 20: air outlet structure | 23: impeller |
| 25: purified air outlet | 27: purified air outlet passageway |
| 30: air purifying compartment | 31: outer structure |
| 33: inner structure | 34: purifying stage |
| 35: filling hole | 37: discharge hole |
| 39: first partition wall | 41: second partition wall |
| 43: projecting rings | 45: inlet holes |
| 47: outlet holes | 49: inner passageway |
| 51: purifying chamber | 53: mixed liquid filter |

DETAILED DESCRIPTION OF THE INVENTION

A device of the invention includes (a) an air inlet structure for taking in contaminated air, (b) an air purifying compartment connected to the air inlet structure at one end for purifying contaminated air, and (c) an air outlet structure connected to the air purifying compartment at another end for discharging purified air to the outside. An invented device purifies air using a liquid filter which is formed when the air purifying compartment rotates. An invented device further includes (a) an outer case located outside the air purifying compartment to protect the air purifying compartment that rotates at a high speed and (b) a bearing that supports and allows the air purifying compartment to rotate. An invented device also includes a motor that is coupled to the air purifying compartment to enable the air purifying compartment to rotate around a rotational axis. The motor supplies motive power to rotate the air purifying compartment. The invention further utilizes mixed liquid to purify air.

It is recommended that the invention includes filling holes and discharge holes. The filling holes are placed at suitable locations on the outer surface of the air purifying compartment to allow treatment liquid to be poured into the air purifying compartment. The discharge holes are also placed at suitable locations on the outer surface of the air purifying compartment to allow the treatment liquid to be dispensed out of the air purifying compartment. It is also recommended that projecting rings having an appropriate, fixed height are placed on an inner structure and project outwardly along a radial direction from the inner structure and that the projecting rings are placed inside the air purifying compartment.

The invention purifies air using the following methods that utilize mixed liquid. The invention provides a method of forming a mixed liquid filter that abuts against the inner surface of an outer structure of each purifying stage of the air purifying compartment. The mixed liquid filter is formed by centrifugal force produced by the rotation of the air purifying compartment coupled to a motor.

The invention further provides a method of taking in air. An impeller which is at the air outlet structure creates a pressure difference which causes contaminated air created by a contaminant to move into a contaminated air transfer chamber, a contaminated air inlet, and a contaminated air inlet passageway to reach the air purifying compartment.

The invention also provides a method of purifying air in which the contaminated air that was transferred into the air purifying compartment using the aforementioned method of taking in air moves into a purifying chamber through inlet holes. The purifying chamber is in one of the air purifying stages that form the air purifying compartment. The contaminated air is purified when it comes into contact with the mixed liquid filter.

The invention further provides a method of discharging purified air. The purified air that exits outlet holes of a purifying stage passes through a purified air outlet passageway, a purified air outlet, and the impeller. The purified air then finally reaches the final outlet to be discharged to the outside world.

The invention further provides a method of transferring air. The air that exits the outlet holes of a purifying stage is transferred to the next purifying stage through an inner passageway and inlet holes of the next purifying stage.

Because the invention utilizes a simple mechanical structure and a simple purifying process, it is highly economical with respect to its operational and maintenance costs, and the invention achieves a high degree of purification efficiency by utilizing multi-stage mixed liquid filters formed by centrifugal force.

Figure 2:
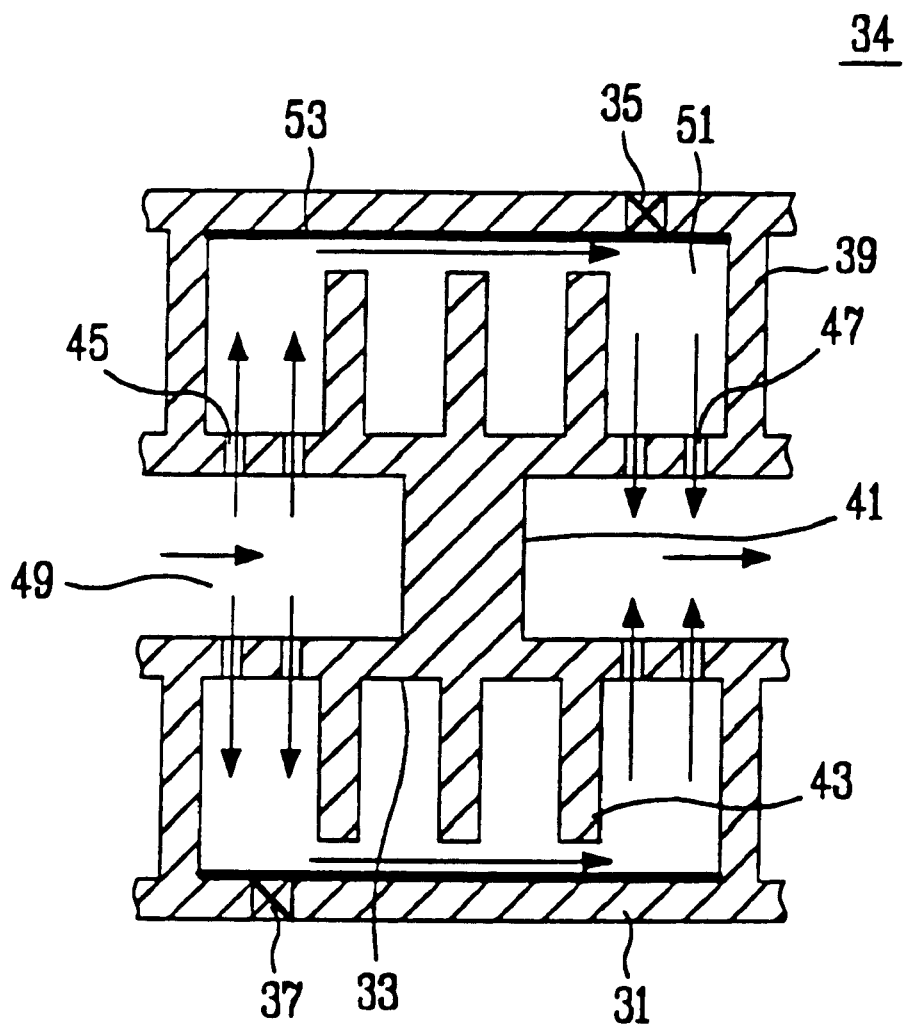
FIG. 2 illustrates a cross-sectional view of stage I of a multi-stage air purifying device of the invention.

An air purifying device is described below as an example with reference to the attached figures. FIG. 1 illustrates a cross-sectional view along the axial direction of an exemplary air purifying device of the invention using mixed liquid. FIG. 2 illustrates a cross-sectional view of purifying stage I of the multi-stage air purifying compartment. Referring to FIG. 1, contaminated air moves from the left side to the right side as indicated by the arrows. The structure of an air purifying device of the invention is described as follows with reference to FIGS. 1 and 2.

An air purifying device of the invention shown in FIG. 1 includes an air inlet structure 10 for taking in contaminated air and an air outlet structure 20 for discharging purified air. The air inlet structure 10 is located at one end of the device. The air outlet structure 20 is located at another end of the device. The air purifying device also includes an air purifying compartment 30 that includes a mixed liquid filter formed by centrifugal force. In addition, the air purifying device includes an outer case 1 located outside the air purifying compartment 30 to encase the air purifying compartment. The outer case 1 protects the air purifying compartment 30 that rotates at a high speed. The air purifying device also includes a bearing 3 that supports and allows the air purifying compartment 30 to rotate. A shaft 7 that comes out from a motor 5 is connected to the air purifying compartment 30 to rotate the air purifying compartment 30.

Various other components of an air purifying device of the invention are described below. Referring to FIG. 1, the air inlet structure 10 includes (a) a contaminated air transfer chamber 11 that is used to transfer contaminated air, (b) a contaminated air inlet 13 that takes in the contaminated air, and (c) a contaminated air inlet passageway 15 that is used to transfer the contaminated air into the air purifying compartment 30. The contaminated air inlet passageway 15 is formed in the inner chamber of an inner structure 33 which is extended outwardly along the rotational axis of the air purifying compartment 30. The contaminated air inlet passage way 15 transfers the outside air into the air purifying compartment 30. The contaminated air inlet 13 is formed by piercing through the extended portion of the inner structure 33.

The shape of the air inlet structure 10 depends on various factors such as the size and type of contaminated air. Because the extended portion of the inner structure 33, which includes the contaminated air inlet 13 and the contaminated air inlet passageway 15, rotates with the air purifying compartment 30, it is recommended that the contaminated air transfer chamber 11 and others do not make a contact with the extended portion of the inner structure 33, the inner structure 33, or the air purifying compartment 30. It is also recommended that the size, shape, and number of the contaminated air inlet 13 are adjusted depending on the amount of contaminated air.

The air purifying compartment 30, which purifies air, includes an outer structure 31, the inner structure 33, and multiple purifying stages 34. The outer structure 31 forms the outer shape of the air purifying compartment 30, and mixed liquid filters are formed up against the outer structure 31. The inner structure 33 is inside the outer structure 31 and forms inner passageways. The multiple purifying stages 34 are used to purify the contaminated air.

One of the purifying stages 34 indicated as purifying stage I in FIG. 1 is described more fully with reference to FIG. 2. In FIG. 2, a purifying stage 34 includes (a) a purifying chamber 51 for purifying contaminated air, (b) inner passageways 49 for coupling one purifying stage to the next, and (c) inlet holes 45 and outlet holes 47 for coupling the purifying chamber 51 to the inner passageways 49.

Each purifying chamber 51 is formed by a portion of the outer structure 31, a portion of the inner structure 33, and two first partition walls 39. The first partition walls are placed between the outer structure 31 and the inner structure 33, and divide up the air purifying compartment into multiple purifying chambers by sealing off the gap between the outer structure and inner structure. A second partition wall 41 is placed in the inner chamber of the inner structure 33 at about the center of each purifying stage 34 and divides up the inner chamber formed by the inner structure 33 into multiple inner passageways 49 by sealing off the inner chamber of the inner structure 33 at about the center of each purifying stage. Each such inner passageway 49 lies adjacent to each such purifying chamber 51. The inner structure 33 has the inlet holes 45 and outlet holes 47. The inlet holes 45 are located at one end of each purifying stage 34. The outlet holes 47 are located at another end of each purifying stage 34.

It is recommended that the size and number of the inlet holes 45 and the outlet holes 47 are adjusted according to the amount of contaminated air in the purifying chamber 51. It should be noted that because the air purifying compartment 30 is in the shape of a cylinder, as shown in FIGS. 1 and 2 which illustrate cross-sectional views of the air purifying compartment along its axial direction, the purifying chamber 51 and other components of the air purifying compartment 30 are symmetrical about the rotational axis.

A purifying stage 34 is described in detail with reference to FIG. 2. Each of the first partition walls 39 extends radially from the inner structure 33 to the outer structure 31. The first partition walls 39 form the purifying chambers 51 by partitioning the air purifying compartment into multiple purifying stages. The gap between the inner structure 33 and the outer structure 31 is sealed off at each purifying stage to provide separate purifying stages. If the air purifying compartment 30 has only a single purifying stage, the first partition walls 39 will not be necessary and will be replaced by a portion of the outer structure 31.

The second partition walls 41 form the inner passageways 49 by partitioning the inner chamber of the inner structure 33 into multiple purifying stages. Each inner passageway 49 is used to transfer air from one purifying stage to the next in a multi-stage air purifying system. If the air purifying compartment 30 has only a single purifying stage, the inner passageways 49 that connect each purifying stage become the contaminated air inlet passageway 15 and the purified air outlet passageway 27.

Additionally, a mixed liquid filter 53 can be formed in the purifying chamber 51 inside the outer structure 31. The outer structure includes the filling hole 35 and discharge hole 37. Each purifying stage 34 has a filling hole 35 and a discharge hole 37 at their predetermined, suitable locations through the outer structure.

Generally, each of the filling hole 35 and discharge hole 37 has a sealing mechanism that prevents contaminated mixed liquid from leaking out during a high speed rotation while the holes can be also used to pour in any liquid without any other special mechanism. It is recommended that one-way check valves are provided to prevent any reverse flow of the liquid during a high speed rotation.

In addition, annular projecting rings 43 are formed by extending ring structures along a radial direction from the inner structure 33. The projecting rings 43 should have a fixed height that does not seal off the purifying chamber 51. The projecting rings 43 form a path to bring the contaminated air entering through the inlet holes 45 into a direct contact with the mixed liquid filter 53 that is inside the purifying chamber 51. Based on the amount of contaminated air and the thickness of the mixed liquid filter 53, the height of the projecting rings 43 should be determined appropriately to provide a suitable gap between the projecting rings 43 and the mixed liquid filter 53 so that contaminated air is purified efficiently. The thickness of the mixed liquid filter 53 can be calculated based on the amount of mixed liquid. The amount of mixed liquid required depends on the amount of contaminated air.

It is recommended that the projecting rings 43 are placed on the inner structure 33 with an appropriate amount of lateral distance between the projecting rings along the axial direction to sustain an intimate and continuous contact between the contaminated air and the mixed liquid filter 53. FIGS. 1 and 2 show, as an example, three projecting rings 43 for each purifying stage.

Referring back to FIG. 1, the air outlet structure 20 includes a purified air outlet passageway 27, a purified air outlet 25, and an impeller 23, The purified air outlet passageway 27 is used to transfer the purified air coming from the air purifying compartment 30. The purified air outlet 25 discharges the purified air. The impeller 23 guides and induces the purified air to flow out from the air purifying compartment 30. In addition, the air outlet structure 20 includes an outlet case 21 and a final outlet 29. The outlet case 21 protects the rotating impeller 23. The final outlet 29 expels the purified air to the outside, such purified air being guided by the impeller.

The purified air outlet passageway 27 is formed in a portion of the inner chamber of the inner structure 33 which is extended outwardly along the longitudinal axis of the air purifying compartment 30. The purified air outlet passageway 27 connects the air purifying compartment 30 to the outside air. The purified air outlet 25 is formed by piercing holes in the extended portion of the inner structure 33. The impeller 23 is located just outside the extended portion of the inner structure 33.

It is recommended that the capacity of the impeller 23 is chosen based on factors including without limitation the amount of contaminated air and the number of the purifying stages 34 in the air purifying compartment 30. As described above, an air purifying device of the invention is relatively simple in structure. It includes an air inlet structure 10, an air outlet structure 20, and an air purifying compartment 30.

An operation of an air purifying system of the invention is described below with reference to FIGS. 1 and 2. When the motor 5 starts to rotate, the air purifying compartment 30 that is connected to the motor 7 by means of a shaft 7 also starts to rotate. After the air purifying compartment 30 rotates for a prescribed number of rotational cycles, centrifugal force causes the mixed liquid filter 53 to form and abut against the inner surface of the outer structure 31 of each purifying stage 34 inside the air purifying compartment 30.

At the same time, the rotation of the impeller 23 located outside the extended portion of the inner structure 33 produces a pressure difference between the air pressure in the air purifying compartment 30 and the air pressure outside. Due to the pressure difference, contaminated air enters into the contaminated air transfer chamber 11 in the air inlet structure 10 and flows through the contaminated air inlet 13. The contaminated air then flows through the contaminated air inlet passageway 15 to reach the air purifying compartment 30.

The contaminated air that reaches the air purifying compartment 30 passes through the inlet holes 45 to reach a purifying chamber 51 in one of the purifying stages 34 in the air purifying compartment 30 where the contaminated air is purified by coming into direct contact with the mixed liquid filter 53.

This purifying method involves various processes including without limitation absorption, dilution, dissolution and disassimilation depending on the characteristics and attributes of contaminated materials. The major constituent of the mixed liquid is water ($H_2O$). Other substances including without limitation $FeSO_4$, LiOH, and NaOH may be added to water depending on the composition of contaminated air. Substances such as SOx, NOx, COx, and C that are the major constituents of contaminated air will be diluted by the mixed liquid, and decomposed through chemical reactions with the mixed liquid. Water ($H_2O$), which is the major constituent of the mixed liquid, absorbs solid materials including without limitation dust and particles that are in the contaminated air. A purifying system of the invention is simple and inexpensive to operate because it uses water ($H_2O$) which is readily available as the major constituent of a mixed liquid, and only a small amount of chemical is added as needed.

The composition ratio of the constituents of a mixed liquid can be adjusted depending on the degree and condition of the contamination. This is a major factor that affects the efficiency of the air purification process. Types of chemicals needed in a mixed liquid and the appropriate composition ratios vary depending on the composition of contaminated air and the degree of contamination, and such information is known in the art. In addition, liquid preparation methods that are suitable for a particular liquid composition are well-known in the art, especially in the field of the study of harmful gas. Information known in the art is not described further.

The projecting rings 43 having a prescribed height that does not seal off the purifying chamber 51 are located inside the purifying chamber 51. Each of the projecting rings 43 projects along a radial direction. The projecting rings 43 form a direct path between the inlet holes 45 and the mixed liquid filter 53 to guide the flow of the contaminated air so that the contaminated air entering through the inlet holes 45 is brought into a direct contact with the mixed liquid filter 53 that is inside the purifying chamber 51. The projecting rings 43 that are arranged axially on the inner structure 33 form another path along the mixed liquid filter 53 to guide the flow of the air so that the contaminated air is continuously in contact with the mixed liquid filter 53 inside the purifying chamber 51. As a result, the contaminated air will be purified thoroughly and fully inside the purifying chambers 51.

The contaminated mixed liquid produced from the purifying process of the invention mentioned above can be discharged completely and easily after a prescribed operating time period using the discharge hole 37. New mixed liquid can be poured in using the filling hole 35.

Treated air, which has been processed in one of the purifying stages as described above, is transferred into the inner passageway 49 through the outlet holes 47, and then transferred into the next purifying stage 34 through the inlet holes 45 of the next purifying stage 34 for further purification. Once the contaminated air has passed through a series of purifying stages 34 and transfer stages, the contaminants in the air are eliminated, and the air is purified. The purified air flows out through the outlet holes 47 located in the final purifying stage 34 of the air purifying compartment 30 and reaches the purified air outlet passageway 27. The purified air in the purified air outlet passageway 27 reaches the impeller 23 by passing through the purified air outlet 25. The purified air then flows out to the atmosphere by passing through the final outlet 29.

As described above, this invention is simple and utilizes a contaminated air inlet stage, an air purifying stage, and a purified air outlet stage. While the invention utilizes, among others, a simple mechanical structure and a simple purifying process, the invented system can provide purification efficiency that is significantly higher than that of existing systems.

Figure 3:
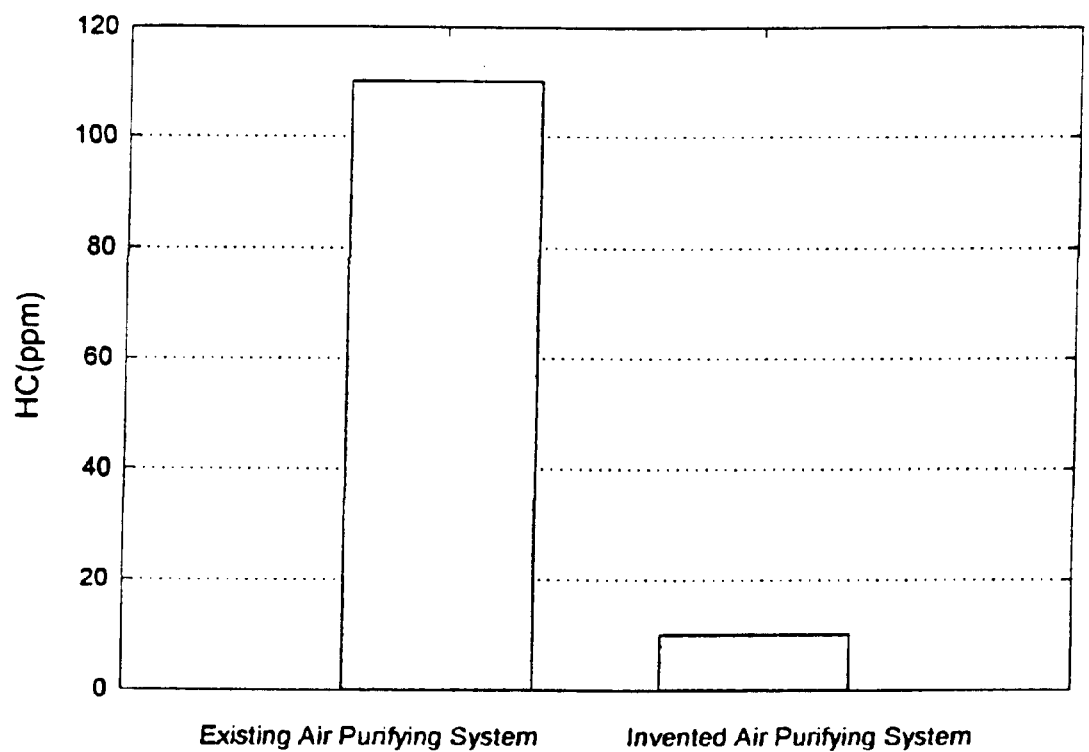
FIGS. 3a–3b are graphs that illustrate the efficiency of an air purifying device of the invention in comparison with that of an existing device.

FIGS. 3a–3b present graphs that show purification efficiency test results of an invented purifying system in comparison with those of an existing system. The tests were performed on automobile exhaust gas. The purifying system of the invention used in this test had an air purifying compartment that included only a single purifying stage that had three projecting rings as shown in the previous figure. It included other components that are similar to those previously described. The mixed liquid used in this test included NaOH, $FeSO_4 \cdot 7H_2O$, and $H_2O$. As shown in FIGS. 3a and 3b, while the existing air purifying system reduced the level of hydrocarbon (HC) to 110 ppm and the level of carbon monoxide (CO) to 0.6%, the single stage system of the invention reduced the level of hydrocarbon to 10 ppm and the level of carbon monoxide to 0.1%. Particularly, while the existing system reduced the amount of dust to 30%, the single stage system of the invention rapidly reduced the amount of dust to 2%. As the range of possible error is the same in each of the tests conducted, the efficiency of this invented purifying system can be fully appreciated from these results.

Although an invented air purifying system having multiple purifying stages is shown and described as one example in the overall description of this invention, the invented purifying system is able to include any number of purifying stages depending on, among others, the amount of contaminated air and the constituents of contaminated air. For example, the number of purifying stages can be the same as the number of constituents of the contaminated air, where each purifying stage has different mixed liquid. In addition, to increase the efficiency of the air purification process, it is possible to use multiple purifying stages and liquids for each constituent of the contaminated air. Other variations are also possible including a single purifying stage system as described above with respect to the tests conducted in which a single purifying stage having mixed liquid is used to treat various contamination constituents.

While the invention has been particularly described with reference to certain examples, one having ordinary skill in the art would know that there may be many other ways to implement the invention without departing from the sprit and scope of the invention. The various figures and embodiments shown are for illustration only and should not be taken as limiting the scope of the invention. Many changes and modifications may be made to the invention without departing from the sprit and scope of the invention.

What is claimed is:

1. An apparatus comprising:
    an inlet to take in contaminated air;
    an outlet to discharge purified air; and
    a rotatable compartment to purify said contaminated air using liquid, said liquid being enclosed within said rotatable compartment, said rotatable compartment coupled to said inlet and said outlet to rotate together, wherein said rotatable compartment comprises:
    a first structure that forms an outer shape of said rotatable compartment, said first structure having an inner surface, said inner surface to support a liquid membrane;

a second structure to transfer air, said second structure placed inside said first structure;

a plurality of first partition structures extending radially from said second structure to said first structure; and a stage to purify air, said stage defined by a portion of said first structure, a portion of said second structure and a pair of first partition structures, said portion of said first structure forming an outer shape of said stage, said portion of said second structure forming an inner shape of said stage.

2. The apparatus of claim 1, further comprising:

a case that protects said rotatable compartment, said case placed outside said rotatable compartment;

a bearing to allow said rotatable compartment to rotate, wherein said bearing supports said rotatable compartment; and a motor to supply power and to enable said rotatable compartment to rotate around a rotational axis, said motor coupled to said bearing.

3. The apparatus of claim 1, wherein said stage comprises:

a chamber to purify air, said chamber formed axially between a portion of said first structure and a portion of said second structure, and radially between said first partitions;

passageways to transfer air, said passageways placed within an inner chamber of said second structure, said passageways placed adjacent to said chamber, said passageways being formed by having a second partition structure that is placed in said inner chamber, wherein said second partition structure axially divides up said inner chamber of said second structure at predetermined axial distances; and a first opening and a second opening formed by piercing through said portion of said second structure, wherein said first opening couples a first one of said passageways to said chamber, wherein said second opening couples a second one of said passageways to said chamber.

4. The apparatus of claim 3, wherein said first structure further comprises (a) a third opening to pour in said liquid into said chamber and (b) a fourth opening to discharge said liquid from said chamber.

5. The apparatus of claim 3, wherein said stage further comprises a third structure that extends radially from said second structure to a first fixed height without sealing off said chamber, said third structure placed inside said chamber.

6. A The apparatus of claim 5, wherein said stage further comprises a fourth structure that extends radially from said second structure to a second fixed height without sealing off said chamber, said fourth structure placed on said second structure along the direction of a rotational axis at a predetermined distance from said third structure, said fourth structure placed inside said chamber, said first fixed height to provide a first gap between said third structure and said liquid membrane, said second fixed height to provide a second gap between said fourth structure and said liquid membrane.

7. The apparatus of claim 1, wherein said rotatable compartment is cylindrical and rotatable around an axis.

8. The apparatus of claim 1, wherein said liquid is water.

9. The apparatus of claim 1, wherein said liquid is a mixed liquid, said mixed liquid comprising water and a constituent selected from the group consisting of $FeSO_4$, LiOH, and NaOH.

10. A method, comprising:

(a) providing a compartment with an inlet and an outlet;

(b) filling said compartment with a predetermined amount of a liquid to be enclosed within said compartment;

(c) rotating said compartment and its inlet and outlet;

(d) producing centrifugal force;

(e) forming a liquid membrane using said centrifugal force;

(f) taking in contaminated air through said inlet into said compartment;

(g) bringing said contaminated air into a contact with said liquid membrane in said compartment; and (h) discharging purified air, said method further comprising:

transferring said contaminated air along an axial direction of said compartment;

transferring said contaminated air radially outward in said compartment through a first opening means formed on the inside wall of said compartment;

transferring air that is in said contact with said liquid membrane along said axial direction;

transferring said air radially inward in said compartment through a second opening means formed on the inside wall of said compartment; and transferring said air along said axial direction.

11. The method of claim 10, further comprising:

starting a motor that causes said compartment to rotate; and rotating an impeller that produces a pressure difference between an air pressure in said compartment and an outside air pressure and that causes said contaminated air to enter into said compartment.

12. The method of claim 10, further comprising:

transferring air from one stage to another stage in said compartment.

13. The method of claim 10, wherein (e) comprises:

abutting said liquid membrane against an inner surface of a first structure, wherein said first structure forms an outer shape of said compartment;

(f) comprises:

rotating an impeller that produces a pressure difference between an air pressure in said compartment and an outside air pressure;

transferring said contaminated air into a first chamber;

transferring said contaminated air through a first opening; and transferring said contaminated air into a first passageway formed within a second structure, wherein said second structure forms an inner shape of said compartment;

(g) comprises:

transferring said contaminated air through a second opening formed through said second structure;

transferring said contaminated air into a second chamber;

treating said contaminated air by providing a continuous contact between said contaminated air and said liquid membrane using third structures, wherein said third structures extend radially within said second chamber, have a fixed height, and have a predetermined spacing between said third structures, and are arranged along an axial direction of said compartment; and transferring treated air through a third opening formed through said second structure; and (h) comprises:
transferring said purified air into a second passageway formed within said second structure, separated from said passageway by a partition; and
transferring said purified air through a fourth opening.

14. The method of claim 10, wherein said liquid membrane comprises (a) water or (b) water and a constituent selected from the group consisting of $FeSO_4$, LiOH, and NaOH.

15. A method to purify contaminated air to generate purified air, comprising:
providing a rotatable compartment comprising an inlet, an outlet and at least one chamber between said inlet and outlet, said rotatable chamber being defined axially by an inside wall, an outside wall, and radially by a first partition and a second partition, said rotatable compartment further comprising a first inner passage and a second inner passage, said first and second inner passages being formed inside of said second wall, said first inner passage coupling to said chamber through first opening means formed through said inside wall, said second inner passage coupling to said chamber through second opening means formed through said inside wall, said first inner passage and said second inner passage being partitioned by a third partition;
filling said at least one chamber with a predetermined liquid, said liquid being enclosed within said at least one chamber;
rotating said compartment to form a rotating liquid membrane within said at least one chamber;
passing said contaminated air axially through said inlet;
passing said contaminated air axially through said first inner passage and radially outwardly through said first opening means into said at least one chamber to be exposed to said liquid membrane to generate purified air;
passing said purified air radially inwardly from said chamber through said second opening means to said second inner passage,
passing said purified air axially through said second inner passage, and
exiting said purified air through said outlet.

16. A method according to claim 15, further comprising:
connecting an impeller to said outlet to direct air flow into and out of said at least one chamber.

17. A method according to claim 16, wherein said rotatable chamber further comprises means radially extending from said inside wall to disrupt air flow inside said chamber so as to increase exposure of said contaminated air to said liquid membrane.

* * * * *